United States Patent [19]

Vinceller et al.

[11] Patent Number: 4,615,651
[45] Date of Patent: Oct. 7, 1986

[54] THREAD GUIDE BUSHING AND BUSHING HOLDER

[76] Inventors: George Vinceller; George Spector, both of 233 Broadway, Rm 3615, New York, N.Y. 10007

[21] Appl. No.: 642,554

[22] Filed: Aug. 20, 1984

[51] Int. Cl.⁴ .............................................. B23G 1/30
[52] U.S. Cl. ................... 408/72 R; 10/123 R; 408/200; 408/241 R
[58] Field of Search ............... 408/72 R, 72 B, 200, 408/241 R, 241 B, 238, 239, 240; 10/123 R

[56] References Cited

U.S. PATENT DOCUMENTS

| 243,941 | 7/1881 | Miller | 408/200 |
|---|---|---|---|
| 301,101 | 7/1884 | Dodge | 408/200 X |
| 1,448,030 | 3/1923 | Lesslie | 10/123 R X |
| 1,486,774 | 3/1924 | McDermott | 408/241 |
| 1,897,562 | 2/1933 | Petersen | 408/200 |
| 2,013,593 | 9/1935 | Watkins | 408/200 |
| 2,019,391 | 10/1935 | Bond | 408/200 |
| 2,322,901 | 6/1943 | Waldo | 408/215 |
| 2,353,295 | 7/1944 | Day | 408/241 B |
| 3,108,500 | 10/1963 | Merriman | 408/241 B |
| 3,756,736 | 9/1973 | Marcoux | 408/241 B X |

Primary Examiner—Frank T. Yost

[57] ABSTRACT

An improved threading tool kit for forming threads on cylindrical members that have different diameters is provided and consists of a holding member that is pivotally threaded to the underside of a stock. The holding member can accommodate one of a plurality of different size bushings to guide one of the different diameters cylindrical members into the stock to be threaded.

1 Claim, 5 Drawing Figures

THREAD GUIDE BUSHING AND BUSHING HOLDER

BACKGROUND OF THE INVENTION

The instant invention relates generally to threading tools and more specifically it relates to an improved threading tool kit for forming threads on cylindrical members, such as rods, pipes, bolts, etc., having different diameters.

Numerous threading tools have been provided in prior art that are adapted to cut male screw threads. For example U.S. Pat. Nos. 2,013,593; 2,019,391 and 2,322,901 all are illustrative of such prior art, while these units may be suitable for the particular purpose to which they address, they would not be suitable for the purpose of the present invention as heretofore described.

SUMMARY OF THE INVENTION

A principle object of the present invention is to provide an improved threading tool kit that can accommodate one of a plurality of different size bushings to guide different diameter cylindrical memebrs into a stock to be threaded.

An ther object is to provide an improved threading tool kit that can secure one of the bushings within a holding member.

An additional object is to provide an improved threading tool kit that can pivotably attach the holding member to underside of a stock.

A further object is to provide an improved threading tool kit that is simple and easy to use.

A still further object is to provide an improved threading tool kit that is economical in cost to manufacture.

Further objects of the Invention will appear as the description proceeds.

To the accomplishment of the above and related objects, this Invention may be embodied in the form illustrated in the accompanying drawings, attention being called to the fact, however, that the drawings are illustrative only, and that changes may be made in the specific constructions illustrated and described within the scope of the appended claims.

BRIEF DESCRIPTION OF THE DRAWING FIGURES

DETAILED DESCRIPTION OF THE PREFERRED EMBODIMENTS

Figure 1:
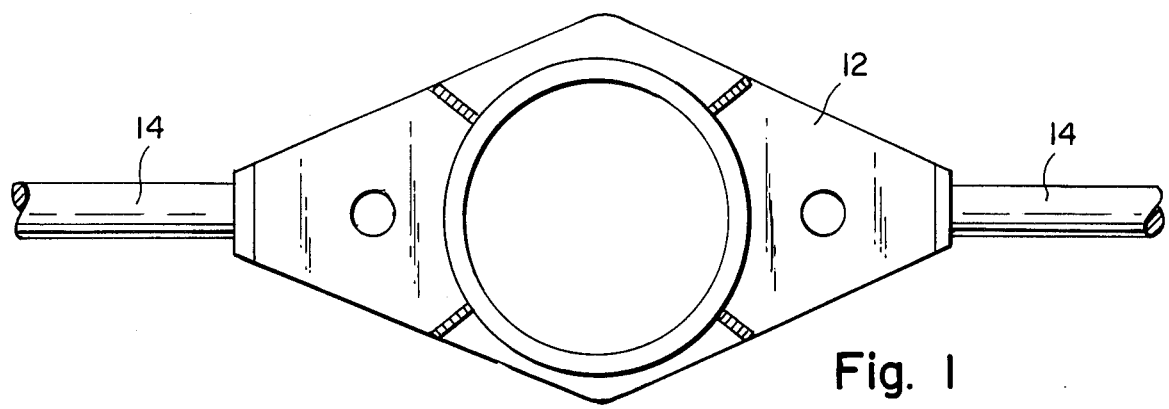
FIG. 1 is a bottom view of the stock.
Figure 2:
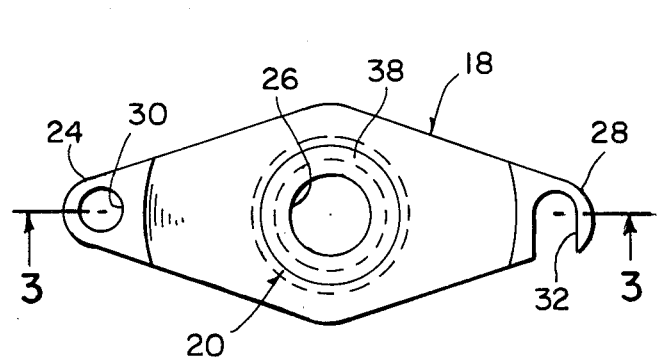
FIG. 2 is a top view of the holding member with the bushing therein.
Figure 3:
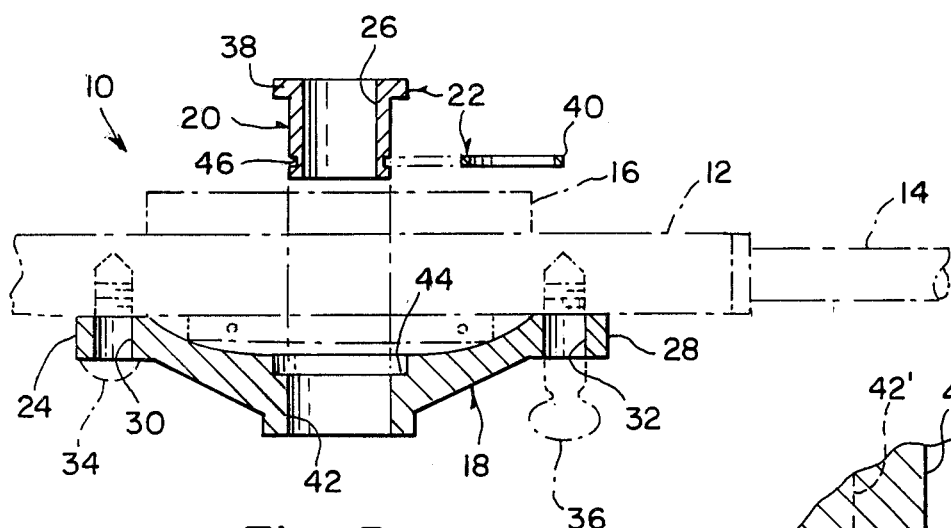
FIG. 3 is a cross sectional view taken along line 3—3 in FIG. 2 showing the stock in phantom with the bushing and the snap ring exploded from the holding member.

Turning now descriptively to the drawings, in which similar reference characters denote similar elements throughout the several views, FIGS. 1 through 3 illustrates an improved threading tool kit 10 for forming threads on cylindrical members such as rods, pipes, bolts etc., having different diameters.

The threading tool kit 10 is of the type that has a stock 12 with two operating handles 14 and a plurality of different size die blocks 16. One of the die block 16 can be placed within the stock 12 as shown in phantom in FIG. 3.

The improvement consists of a holding member 18, a plurality of bushings 20, and a device 22 for securing one of the bushings 20 within the holding member 18.

The holding member 18 is pivotly mounted at one end 24 to the underside of the stock 12, while each bushing 20 has a different interior diameter aperture 26 (only one shown in the drawings).

When the holding member 18 is positioned under the stock 12 and secured at other end 28 to the stock the bushing 20 can guide one of the cylindrical members into the stock to be threaded.

The holding member 18 has a hole 30 at end 24 and a sloted hole 32 at end 28. The holding member 18 is pivotly mounted through the hole 30 to underside of the stock 12 by a shoulder bolt 34 and is secured through the sloted hole 32 to underside of the stock by a thumb bolt 36.

The device 22 for securing one of the bushings 20 within the holding member 18 consists of a flange 38 on top end of the bushing member 18 has a central aperture 42 with a spot face 44 at upper end of the central aperture and the bushing 20 has an anular groove 46 at its bottom end.

The bushing 20 can be placed within the central aperture 42 with the flange 38 seated on the spot face 44 and end with the anular groove 46 extending downward. The snap ring 40 is then mounted on the annular groove 46 of the bushing 20.

Figure 4:
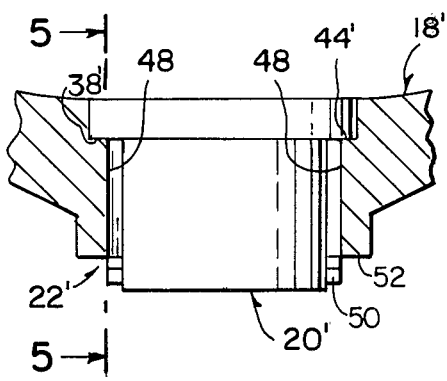
FIG. 4 is an enlarged partial cross sectional view of a modified holding member having slots and the bushing having beveled locking lugs.
Figure 5:
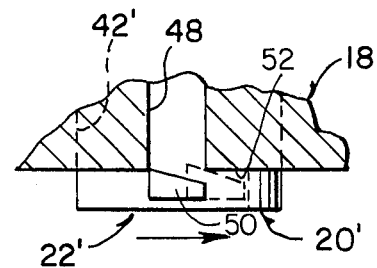
FIG. 5 is a partial cross sectional view taken along line 5—5 in FIG. 4.

FIGS. 4 and 5 shows another device 22' for securing one of the bushings 20' within the holding member 18'. The device 22' consists of the holding member 18' having a central aperture and at least one vertical slot 48. Each bushing 20' has a flange 38' at top end and at least one beveled locking lug 50 at bottom end. The bushing 20' can be placed within the central aperture 42' with the flange 38' seated on the spot face 44' and bottom end with the locking lug 50 extending downward through the vertical slot 48. When the bushing 20' is turned within the central aperture 42' the locking lug 50 will engage underside 52 of the holding member 18'.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An improved threading tool kit for forming threads on cylinders having different diameters; said threading tool kit of the type having a stock having an underside with two operating handles and a plurality of different size die blocks, each said die block can be placed within said stock wherein the improvement comprises:
   (a) a holding member mounted on said underside of said stock having a central socket through said member adapted to receive a plurality of bushings of various sizes;
   (b) a plurality of bushings, each said bushing having a constant external diameter and different interior diameter;

(c) means for securing each of said bushings within and through said socket whereby cylinders of different sizes can be guided accurately for threading, wherein said holding member has two ends, with a hole at one end and a slotted hole at the other end and is pivotaly mounted through said hole to said underside of said stock by a shoulder bolt and is secured through said slotted hole to said underside of said stock by a thumb bolt.

* * * * *